2,715,295
INSECT TRAP AND BAIT

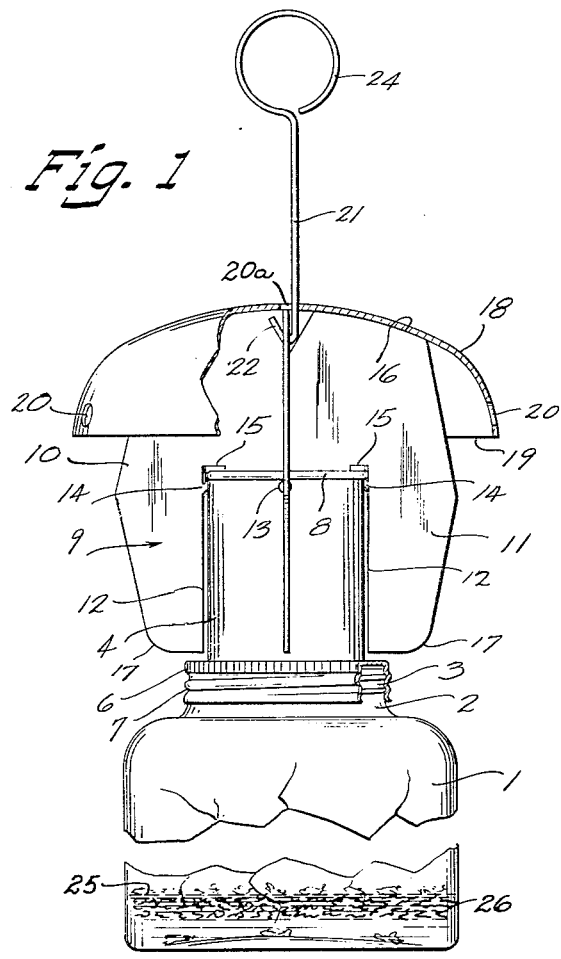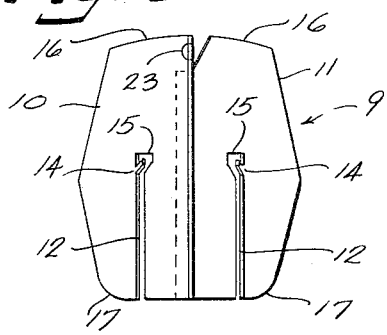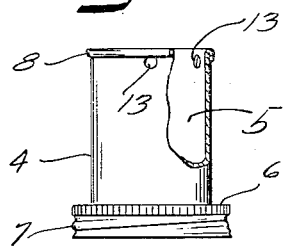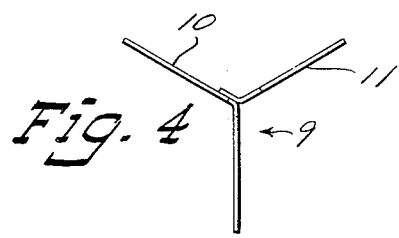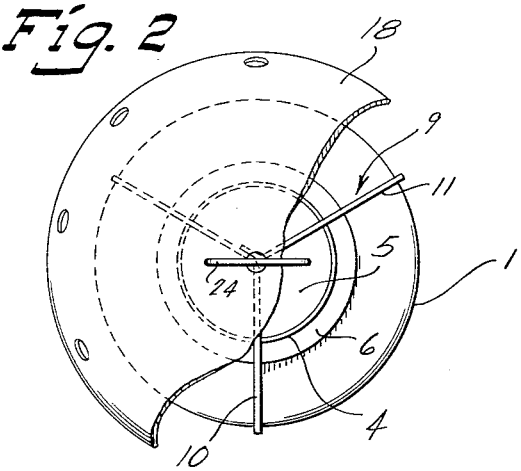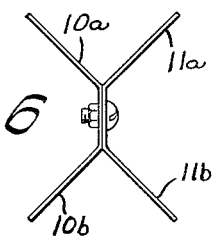
INVENTOR.
William E. Brown
BY Andrus & Nealer
Attorneys

United States Patent Office 2,715,295
Patented Aug. 16, 1955

William Edwards Brown, Pewaukee, Wis., assignor to Dieptron Company, Milwaukee, Wis., a firm partnership Application January 5, 1950, Serial No. 136,894

4 Claims. (Cl. 43—107)

This invention relates to insect traps and more particularly to a new method of trapping flies wherein the gas formed by the fly itself is projected from the trap to lure the fly to within the trap.

An object of this invention is to provide an insect trap that will project over a great distance and wide area a gaseous odor that is irresistibly alluring to the insect and will draw it to the trap from a substantial distance.

Another object is to provide a continuous emission of the said gas thus providing a continuing unbroken path to the trap.

Another object is to provide a gaseous bait having an odor that is detectable by humans only at extremely close range but which will be perceptible to insects at a far greater distance.

Another object is to provide a trap of simple construction and easy assembly that may be readily serviced in a sanitary manner.

Another object of this invention is to provide a trap that prevents an insect once lured to within the trap from escaping therefrom should an insecticide provided in the trap fail to immediately kill the insect.

It has become increasingly apparent that some of our most serious diseases are carried by the fly in particular. Insecticide sprays and bombs have proved effective only in temporarily excluding flies from limited areas. Great reductions in the number of flies in a large area or community can only be accomplished by affirmatively drawing the insect to its destruction prior to and during its reproducing season. To lure many potential carriers of disease to a trap for destruction can be dangerous of itself if the killing agent is not capable of instantaneous destruction and some flies are permitted to escape from the trapping point of disease concentration and to circulate for even a short period of time before death. Insecticides have been developed which will often kill flies upon contact, but it is the object of this invention not only to effectively draw the fly to the trap and destroy it, but of equal importance to completely remove the possibility of escape regardless of the insecticide's effectiveness. Ironically, this is accomplished primarily by employing the insect's desire to escape in preventing that escape, as will be described. Experiments have shown, almost conclusively, that no fly of a variety known in the United States having once entered this trap will attempt to seek escape through the only possible exit available to it.

A further object is to provide a gaseous bait that suggests to the fly that the source of gaseous emission would constitute a desirable location for mating, laying eggs and performing other reproductive functions. Such a bait has proved greatly superior to the "feeding" baits presently employed in fly traps, the latter proving relatively ineffective when in competition with refuse and other food sources often available to the fly.

Another object is to provide a means of killing flies which is selective in its operation whereby the fly, a relatively undesirable insect, is exterminated while beneficial insects are not necessarily reduced in number.

These and other objects of the invention will appear hereinafter in connection with the following description of an embodiment of the invention illustrated in the accompanying drawing.

In the drawing:

Figure 1 is a side elevation of the trap with parts broken away;

Fig. 2 is a top plan view of the same trap;

Fig. 3 is a detail side elevation view of the air foil member before assembly;

Fig. 4 is a detail top plan view of the air foil member shown in Figs. 1 to 3;

Fig. 5 is a detail view of the sleeve member before assembly; and

Fig. 6 is a detail view of a practical variation in air foil design capable of assembly with the other elements described.

The trap employs a gaseous lure that is generated within a transparent or translucent jar or other suitable vessel.

The jar is provided with an upwardly extending duct having an air foil member disposed both within and without the duct.

An opaque light-absorbing shield is provided above the duct to darken its entrance to prevent flies lured to within the jar by the gaseous emission from seeking to escape by the same route, as will be described.

Referring now to the drawings, the trap comprises a transparent or translucent container 1 preferably shallow and open only at a cylindrical neck 2 formed in its top surface and with neck 2 substantially centrally located in said top surface.

Container 1 is provided as a combination fly collection and gas generating compartment as will be fully described.

Neck 2 is illustrated with threads 3 formed on its outer periphery.

Communicating with neck 2 is opaque cylindrical sleeve 4 disposed above container 1.

Sleeve 4 is open at both ends and is substantially equal in diameter to the interior diameter of the neck 2 to provide duct 5 leading from container 1.

Sleeve 4 has formed at its bottom edge an annular collar 6 having an inner diameter slightly greater than the outer diameter of neck 2 so that collar 6 can encompass neck 2.

The inner surface of collar 6 is formed with threads 7 to engage the threads 3 on neck 2 and secure sleeve 4 to container 1.

Collar 6 and threads 7 may be so formed as to permit the attachment of sleeve 4 to a standard glass jar such as employed for home preserving of fruits and the like, and any such standard jar having a centrally located neck and surrounding shoulder could be substituted for container 1 if transparent or translucent.

It is not necessary that container 1 be the threaded male member nor that sleeve 4 be the female member as described.

A tightness of fit between threads 3 and 7 should be such as to permit ready removal of sleeve 4 from container 1.

It would be possible to form container 1 and sleeve 4 from the same material, but it further would be advisable to coat sleeve 4 so as to render it opaque.

The upper edge of sleeve 4 is turned slightly to form an annular lip 8, its function to be subsequently described.

Air foil or fin member 9 is disposed both within and without sleeve 4 extending downwardly closely adjacent to neck 2.

Air foil 9 should be formed from thin plates so its disposition within sleeve 4 will not unduly obstruct duct 5.

As illustrated, air foil 9 may comprise three fins formed from two thin sheets of metal designated as members 10 and 11, as shown before assembly in Figs. 3 and 4.

Member 10 is creased along its vertical centerline to provide two fins spaced 120° apart. Member 11 is bent to form a small vertical marginal flange at a 120° angle thereto, and said flange is welded to member 10 adjacent to its vertical crease.

Members 10 and 11 are formed with vertical slots 12 equally spaced from the vertical centerline of member 10 at a distance corresponding to the radius of sleeve 4 and extending a substantial distance from their bottom edges. Sleeve 4 may thereby be disposed within slots 12 upon assembly.

The upper portion of sleeve 4 contains three small apertures 13 radially spaced 120° apart.

Apertures 13 are provided to receive easily bendable projections 14 extending upwardly and inwardly from the outer edges of slots 12 and disposed to extend through apertures 13 to within sleeve 4 to maintain the proper alignment of air foil 9 when assembled and to secure air foil 9 to sleeve 4 when the trap is supported from above.

Notches may be formed in members 10 and 11 at the upper ends of slots 12, as at 15, thus providing a space to accommodate projections 14 when extending through apertures 13.

The top edges 16 of members 10 and 11 are slightly arcuate.

The juncture of the side and bottom edges of members 10 and 11 may be rounded as at 17 to avoid sharp corners that might cut the hands of one assembling or servicing the trap.

The air foil 9 provided by members 10 and 11 need not be limited to three fins nor capable of assembly exactly as shown. Any suitable number of fins and any manner of assembly may be employed, as desired. Fig. 6 illustrates a variation in air foil construction employing four fins 10*a*, 10*b*, 11*a* and 11*b* of a different configuration.

The upper end of sleeve 4 is shaded by light shield 18 disposed above sleeve 4 and air foil 9. Shield 18 is preferably formed to an inverted saucer shape. Shield 18 must be opaque and of a sufficient diameter to prevent light from radiating or reflecting to within duct 5 from above.

As best seen in Fig. 1, the concave undersurface of shield 18 may be of such a complimentary curvature as to permit its solid support by the curved top edges 16 of fin members 10 and 11.

Bottom edge 19 of light shield 18 should be disposed a substantial distance below the top edges 16 of members 10 and 11 to lie closely abreast of the upper edge of sleeve 4 to insure the exclusion of direct light from duct 5. However, edge 19 should not be extended much below the upper edge of sleeve 4 as it would then unduly restrict the lateral movement of a fly seeking to enter duct 5 and interrupt the flow of air through the trap as induced by air foil 9.

As briefly stated above, the trap employs a gaseous lure that is scavenged from container 1 to the region around duct 5 by air foil 9. To permit the gas thus present below light shield 18 to form a light turbulent enveloping film of gas on the upper surface of shield 18, shield 18 is provided with a plurality of small apertures 20 radially spaced closely adjacent to its lower edge 19. The purpose of the gas film so provided will be adequately described.

A centrally located aperture 20*a* in shield 18 permits a supporting wire 21 to extend vertically through shield 18, for attachment at its lower end to fin member 10 and at its upper end to the bough of a tree or shrub to support the trap from above.

The lower end of wire 21 is provided with hook portion 22.

Hook 22 is normally inserted within a small aperture 23 formed in fin member 10 near the top edge thereof only slightly to one side of the vertical centerline of member 10. When suspended from above, wire 21 and its hook 22 support member 10 which in turn supports sleeve 4 and container 1 as a result of connecting projections 14 which secure member 10 to sleeve 4.

The upper end of wire 21 is fashioned with a loop 24 of sufficient size to permit the insertion of a substantially strong bough of a tree or shrub.

Wire 21 provides a guide along which shield 18 may be raised exposing duct 5 to permit the introduction of additional bait, while still restricting direct light from the interior of duct 5.

A gas is produced in container 1 by the action of a generating fluid upon the bodies of the flies themselves. It is not necessary to distinguish between known varieties of flies as the reactions produced by the generating fluid will be identical for purposes of trapping.

The generating fluid 25 as shown disposed in container 1 preferably comprises an insecticide, a wetting agent, an electrolyte, an alkaline substance and water. For application to flies the following composition has proven most successful:

| | Parts by weight |
|---|---|
| DDT (dichloro diphenyl trichloroethane) | .02 |
| Clay [1] | .02 |
| Aerosol OT (di-octyl sodium sulphosuccinate) | .02 |
| Calcium chloride | .50 |
| Calcium carbonate | .20 |
| Water | 99.24 |
| | 100.00 |

[1] Ingredient normally present in commercial DDT powder with which the DDT is ground to give it greater dispersion in water.

The insecticide, wetting agent, electrolyte and alkaline substance need not be those specified above, nor are the stated proportions critical. However, the insecticide should not be of such a strength as to eat into the insect and kill the bacterial organisms associated with the dead fly, for these organisms and the enzymes of the digestive system are relied upon to produce the nitrogenous gases common to the fly's digestive system which are employed as a lure to live flies, as will be further described.

The components should be of a non-fatty nature to avoid the creation of a fatty film above the generating fluid which will interfere with the gas generation to be described.

Suggested ranges for the components are as follows:

| | Parts by Weight | |
|---|---|---|
| | Lower Limit | Upper Limit |
| DDT | .0050 | 5.00 |
| Clay | .0050 | 5.00 |
| Aerosol OT | .0075 | .20 |
| Calcium chloride | .0050 | 1.00 |
| Calcium carbonate | .0100 | 2.00 |
| Water | 86.80 | 99.9675 |

The generating fluid 25 is placed in the bottom of container 1 to a depth of about one-half inch when employing a container of the shape and size of a standard two-quart mason jar. Container 1 should be agitated slightly to deposit a film of solution upon the vertical walls thereof.

To prime the gaseous action, about two ounces of unsmoked or unsalted fish or stale lean meat, not shown, is placed in the bottom of container 1 in contact with the fluid. Lean meat should be employed to prevent a fatty film from forming above the fluid. Unsalted, uncooked and unsmoked meats are recommended, as it is desired that normal bacterial organisms be present in the meat.

The decomposition of the fish or stale meat will emit an odor sufficient to attract some flies down duct 5 to within container 1.

Upon entering container 1 the fly will be attracted by daylight entering the transparent or translucent walls of container 1 and while investigating the source of light, eventually will contact the fluid.

The emulsion of DDT, aerosol, clay (with which DDT is ground) and water keep the DDT in suspension and insure that the walls of container 1 will retain a coating of the fluid.

The aerosol OT or other wetting agent employed will cause the insecticide component of the fluid to adhere to the body of the fly despite its normally water repellant body film. The toxic effect of the insecticide will eventually cause death.

The wetting agent of the fluid 25 also drowns the fly by plugging the breathing pores on its body.

The wetting agent will render operative capillary forces between the wings and body of the fly which the fly cannot overcome and its wings will be drawn to its body thereby rendering it incapable of flight. This function, as well as its tendency to wet the sides of container 1 rendering it slippery, cooperates with structural features of the trap, to be more thoroughly described, to nullify any possibility of the flies' escape from the trap.

A number of dead flies will eventually accumulate in the fluid 25 disposed on the bottom surface of container 1, at which time there will begin the generation of a gas far more enticing to a live fly than that odor originally provided by the activating primer meat.

Nitrogenous gases of decomposition of the flies are created in a concentrated, continuing manner by a prolongation of the period during which the organisms within the digestive system of the fly continue to function after the death of the fly. The enzymes and bacterial organisms of the digestive systems of all animals are known to continue to function after the death of the animal and in effect cause the body to digest itself.

However, in the case of insects, and flies in particular, this period of post mortem digestive action normally will be of a short duration because of the tendency of its body to rapidly dry out after death, especially when subjected to the normal atmospheric conditions of a warm climate or season.

The prolongation of the aforementioned period of digestive activity is insured only by creating a wet and moist environment about the dead insect.

In an insect trap such a favorable condition cannot be created by the presence of water alone. In the instant example, the first flies to die will directly contact the fluid at the bottom of container 1. The presence of water alone in the fluid would wet the fly sufficiently for some extension of the period of digestive activity thereby causing some increase in normal post mortem gas emission. However, the water repellant surface of the fly body requires the presence of the wetting agent for a major prolongation of said period. After the trap has been in operation an initial period, a floating mass of flies represented diagrammatically as at 26 is accumulated in fluid 25.

As more dead flies are added to mass 26 above the fluid, a layer of bodies would soon prevent the direct contact of the fluid with the more remote bodies were it not for the wetting agent's modification of the surface tension of the fluid whereby the fluid more readily wets the bodies of the flies and by capillary attraction flows upwardly in the accumulated mass of said flies.

In addition, the wetting agent tends to establish a humid and moist condition throughout the whole of container 1 by its action of causing the fluid 25 and its water component to adhere to the side wall of container 1 and to be present at each of the many layers of dead flies which accumulate at the bottom of container 1.

The wet and humid condition within container 1 can be further increased by the addition to the fluid of a hygroscopic (electrolyte) substance such as calcium chloride. This component will substantially increase the wetting power of the aerosol OT or other wetting agent employed. However, gas emission will satisfactorily occur without the presence of this component.

The capillary action by which the fluid 25 reaches a layer of flies substantially remote from its original liquid level also causes the insecticide to be present at said remote layer and a fly alighting upon such an upper layer would contact the insecticide and wetting agent there disposed and be poisoned or suffocated as previously described.

The generating fluid 25 tends to absorb the bodies of the flies as their decomposition continues. The rate of absorption is somewhat less than the intake rate of the trap and eventually the trap will become full of dead flies despite the great decrease in volume displacement of the fly mass as it is partly converted into water vapor and the gaseous substance enticing to live flies.

The gas generation begins to greatly diminish in temperatures below 60° Fahrenheit. However, this reduced rate of generation in cooler seasons of the year may be increased by the application of heat to the trap at such times.

The addition of calcium chloride to the generating fluid will also have an anti-freeze effect within container 1 to combat the tendency of the gas generation to diminish in cool weather.

Before being emptied, the trap should be agitated to insure that all insects therein are placed into contact with a large amount of the toxic fluid and promptly killed.

The trap can be readily emptied by disengaging threads 3 and 7 and removing container 1. All other elements of the trap can remain assembled.

A small amount of the generating fluid and water introduced into container 1 after emptying will rinse clean the upper part of the container when the same is agitated.

It is desirable to retain an inch or more of the dead flies in the bottom of container 1 after emptying to attract additional flies where it is desired that the trap resume operation. This will eliminate the necessity of once again employing activating primer meat.

It may be desired to dispose of the dead flies by burying them in a garden as they have a high fertilizer value.

The nitrogenous gases evolved in container 1 are copiously and continuously emitted. A forced draft from any outside wind directed to within container 1 by air foil member 9 will mix with the gas and carry it to without container 1 in a continuous path which will extend a considerable distance from the trap to direct the fly thereto.

Though detected by the fly in an infinitesimal concentration at a point of great diffusion, the gas will strongly attract both male and female flies. The fly is first drawn to the path of gas projection and then along that path to the trap. It would seem that the gas suggest to a fly a desirable location in which to lay eggs and perform other natural acts necessary for reproduction, and the fly will be seen to make a zigzag investigational flight towards increased gas concentration.

Because of the directional emission of the gas from the trap, the fly, upon arriving at the trap, may momentarily lose the scent. Upon losing the scent, the fly will immediately seek a landing place and will generally remain there until air currents once again loft the scent its way.

The top leeward surface of saucer shaped light shield 18 provides a good landing surface and flies will often choose to pause there even in strong winds.

As stated above, apertures 20 formed on shield 18 will cause a thin turbulent enveloping film of gas to form on the upper surface of shield 18. The escape of small quantities of gas outwardly through apertures 20 will indicate to the fly that the source of the gas is below shield 18 and the fly will make its way to the underside of shield 18, to the vertical edges of air foil 9 or to annular lip 8 formed on the upper edge of sleeve 4.

Lip 8 provides a means for the fly to travel over the otherwise somewhat sharp upper edge of sleeve 4 and a ledge upon which a hesitant fly may pause.

Once the fly establishes that container 1 is the source of the enticing gas, it will enter container 1 through duct 5.

When the fly has reached lip 8 at the entrance to sleeve 4 and duct 5 it will experience a light transition. To this point a region of substantial light intensity has existed about and behind the fly's path of travel. However, when the fly reaches lip 8, the light-absorbing shield 18 cuts off light from behind his direction of travel and light is only transmitted to the fly upwardly through duct 5 from transparent or translucent container 1. The attraction afforded by the newly discovered source of light will combine with the fly's olfactory directional senses to insure the fly's travel down duct 5 to within container 1.

Having entered container 1, and regardless of the paralyzing and lethal effect of the generating fluid when contacted by the fly, the fly will make no attempt to leave the trap through dark duct 5, the only exit to container 1.

A detailed study of the habits of the fly have shown that it will always seek escape at points of greater light intensity.

Light-absorbing shield 18, opaque sleeve 4 and air foil 9 present to the fly a dark forbidding view of duct 5 when observed from container 1. It is desirable to provide the undersurface of member 18 and members 4 and 9 with a light-absorbent coating to insure that a minimum of light will be reflected to within duct 5 thereby insuring its darkness.

The transparent or translucent walls of container 1, however, admit light from without the trap and even at night provide a light contrast that immediately attracts the fly to the sides of container 1. The shoulder formed around neck 2 by the upper surface of container 1 diverts any fly crawling upwardly therein so that the fly is drawn away from duct 5.

When drawn to the walls of container 1 by the light contrast, the fly will contact the film of fluid there disposed.

It has been proven that most insects in no way relate a lesser concentration of gas in duct 5 with a means of escape. Instead the insect will make a futile attempt to escape through the transparent or translucent walls of container 1.

It has been conservatively estimated that this trapping means will attract flies from a half mile away. When positioned close to other objects known to be greatly attractive to flies, the trap will cause the fly to completely ignore such other lure. A trap employing a two-quart jar and situated in a fly-infested location, such as behind a meat market, will become filled in a day. When located near a residential building the trap will require less frequent emptying.

Odor emitted by the trap will be detected by humans at a distance of seldom more than twenty-five feet.

It may be found advantageous to add an alkaline substance such as calcium carbonate to the generating fluid. Such an additional component, though not essential to the generating fluid, increases nitrogenous gas emission by combining with acidic products of decomposition thereby freeing a greater quantity of the alkaline nitrogenous gas which proves alluring to the fly. A rancid odor also is less likely to be present in the trap as a result of such addition, rancidity having proved distasteful to the fly.

Various embodiments of the invention may be employed within the scope of the accompanying claims.

I claim:

1. In a fly-trap, a transparent container having an upper open end, an opaque duct member having a lower end connected to said upper open end of the container, an opaque shield disposed above the upper open end of said duct member and having a downward circular rim concentric of and larger than the upper open end of said duct member, said shield serving to close the upper end of the duct member to extraneous light whereby flies tracing a lure into the duct member will be further attracted only by light from the container, and a series of radially spaced opaque fin members extending from beneath said shield into said duct member to divide the latter into several passages and extending radially of and on the outside of said duct member whereby air currents approaching adjacent fin members are deflected upwardly into the shield to induce the flow of air through the duct member between adjacent fin members into said container to displace therefrom air and gaseous lure through the duct member between other adjacent fin members for dispersion by air currents passing around the trap.

2. The invention of claim 1, which further includes means for generating the gaseous lure comprising a water solution of an insecticidal agent of limited strength and a wetting agent, said flow of air providing for the evaporation of the water of said solution from the bodies of the wetted flies to accompany the gases generated by the flies deactivated and eventually killed by the insecticidal and wetting agents.

3. A fly-trap comprising a transparent container having an upper open neck, an opaque duct member connected to said upper neck of the container and having an upper opening, an opaque shield spaced above said duct member and shielding the interior of the member from direct light, said shield having a downward circular rim concentrically of and larger than the upper end of the duct member to allow the free flow of air therethrough and defining therewith an entrance into the duct and to the container, and radially spaced supporting members securing said shield above said duct member and dividing said entrance into passageways whereby any normal air current directed into one passageway will be circulated through said container and be discharged from a corresponding opposite passageway.

4. A fly-trap comprising a transparent container having an upper open neck, a water solution partially filling the container and essentially comprising in solution a wetting agent and an insecticidal agent, said insecticidal agent being capable of eventually causing the death of the trapped fly but of limited effectiveness to allow a preceding period for the natural emission of certain gases from the body of the fly, and said insecticidal agent being of sufficiently limited germicidal activity to allow the carcasses of dead flies to accumulate sufficiently in said solution to form a mass supporting an upper exposed layer of flies above the level of the fluid, an opaque duct member connected to said upper neck of the container and having an upper opening, an opaque shield spaced above said duct member and shielding the interior of the member from direct light, said shield having a downward circular rim concentrically of and larger than the upper end of the duct member to allow the free flow of air therethrough and defining therewith an entrance into the duct and to the container, and radially spaced supporting members securing said shield above said duct member and dividing said entrance into passageways whereby any normal air current directed into one passageway will be circulated through said container to mix with said gases and be discharged therewith from the corresponding opposite passageway, said air current being effective to evaporate the water supplied by capillary action to said layer of flies and to accompany said mixed air and gases.

References Cited in the file of this patent

UNITED STATES PATENTS

| 15,378 | Hyter | July 22, 1856 |
| 122,532 | Muller | Jan. 9, 1872 |
| 139,412 | Miller et al. | May 27, 1873 |

(Other references on following page)

UNITED STATES PATENTS

| | | |
|---|---|---|
| 805,352 | Edgar | Nov. 21, 1905 |
| 962,561 | Farrington | June 28, 1910 |
| 970,784 | Bohm | Sept. 20, 1910 |
| 1,012,566 | Maire | Dec. 19, 1911 |
| 1,072,342 | Louviere | Sept. 2, 1913 |
| 1,247,724 | Sassenhoff | Nov. 27, 1917 |
| 1,540,649 | Power et al. | June 2, 1925 |
| 1,598,269 | Derr | Aug. 31, 1926 |
| 1,634,648 | Cardinet | July 5, 1927 |
| 1,783,631 | Sladky | Dec. 2, 1930 |
| 1,964,611 | Watson | June 26, 1934 |
| 1,968,953 | Metzger | Aug. 7, 1934 |
| 2,020,283 | Armstrong et al. | Nov. 12, 1935 |
| 2,176,345 | Hurwitt | Oct. 17, 1939 |

FOREIGN PATENTS

| | | |
|---|---|---|
| 335/31 | Australia | Dec. 9, 1931 |
| 100,950 | Australia | May 4, 1937 |
| 365,231 | Great Britain | Jan. 21, 1932 |